United States Patent [19]
Bechara et al.

[11] B 3,993,652
[45] Nov. 23, 1976

[54] CYCLIC QUATERNARY HYDROXYALKYL PHENOXIDE CATALYSTS FOR ISOCYANATE REACTIONS

[75] Inventors: Ibrahim S. Bechara, Boothwyn; Felix P. Carroll, Chester; Rocco L. Mascioli, Media, all of Pa.; John R. Panchak, Wilmington, Del.

[73] Assignee: Air Products and Chemicals, Inc., Allentown, Pa.

[22] Filed: July 23, 1974

[21] Appl. No.: 490,946

[44] Published under the second Trial Voluntary Protest Program on February 17, 1976 as document No. B 490,946.

Related U.S. Application Data

[63] Continuation-in-part of Ser. No. 377,447, July 9, 1973, Pat. No. 3,892,687.

[52] U.S. Cl. ............... 260/268 BF; 252/426; 260/2.5 AC; 260/2.5 AW; 260/75 NC; 260/77.5 AC; 260/77.5 NC; 260/247.7 S; 260/293.53; 260/268 T
[51] Int. Cl.² ........................ C07D 295/08
[58] Field of Search ............... 260/268 BF, 268 T

[56] References Cited
UNITED STATES PATENTS
3,010,963  11/1961  Erner ........................... 260/268 T

*Primary Examiner*—R.J. Gallagher
*Assistant Examiner*—Jose Tovar
*Attorney, Agent, or Firm*—Richard A. Dannells, Jr.; Barry Moyerman

[57] ABSTRACT

Catalysts having the following formula, prepared in the absence of water, are stable to heat and storage and show high activity in reactions involving organic isocyanates, such as in the production of polyurethane and polyisocyanurate resins:

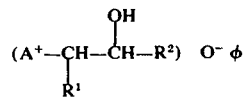

wherein:
A is a mono- or bicyclic tertiary amine having at least 4 carbon atoms in an azine ring,
R¹ is H or an alkyl group of 1 to 10 carbon atoms,
R² is H or an alkyl or aryl group of 1 to 10 carbon atoms, and
φ is a phenyl group, which may be further substituted by one or more hydroxyl or alkyl groups.

Typical compounds, for example, are those corresponding to the formula

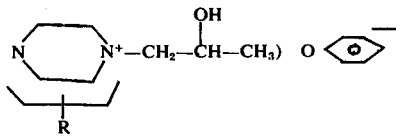

wherein:
R is H or methyl.

3 Claims, No Drawings

CYCLIC QUATERNARY HYDROXYALKYL PHENOXIDE CATALYSTS FOR ISOCYANATE REACTIONS

CROSS-REFERENCE TO RELATED APPLICATION

The present application is a continuation-in-part of application Ser. No. 377,447, filed July 9, 1973, entitled Quaternary Hydroxyalkyl Tertiary Amine Bases as Polyurethane Catalysts, issued July 1, 1975 as U.S. Pat. No. 3,892,687.

BACKGROUND OF THE INVENTION

1. Field of the Invention

This invention relates to the general field of basic catalysis of organic reactions and is particularly concerned with catalysts for promotion of reactions involving organic isocyanates, as in the production of polyisocyanurates and polyurethanes.

2. Prior Art

The reaction of organic isocyanates with hydroxyl compounds is well known to be accelerated by tertiary amines and other suggested catalysts. These reactions are employed extensively in the production of polyurethane foams wherein the foaming action is initiated by an external blowing agent incorporated in the formulation or by reaction of the isocyanate with included water to release carbon dioxide.

While studies have been carried out to determine the relative basicity and other properties of tertiary amines proposed for use as catalysts in reactions involving organic isocyanates, the data so obtained has proven to be of little value in predicting their degree of suitability or effectiveness in commercial formulations for the production of desired polyurethanes or polyisocyanurates.

The use of quaternary ammonium compounds in the production of polyurethane resins is also disclosed in the art; for example in U.S. Pat. Nos. 2,779,689 and 2,981,700; wherein the activity depends upon their decomposition to liberate the corresponding tertiary amines. Typical of these suggested quaternary ammonium compounds are the salts formed by reaction of a tertiary amine, such as N-methyl morpholine, with acid anhydride. The obtained quaternary salts of this type, in general, have lower catalytic activity than the tertiary amines from which they are derived.

Fabris et al in U.S. Pat. No. 3,726,816 lists a number of quaternary ammonium bases stated to be known in the art as catalysts in polyurethane reactions, including among these benzyl trimethyl ammonium hydroxide and heterocyclic quaternary ammonium hydroxides such as N-methyl pyridinium hydroxide and morpholinium bases. The patent also mentions the corresponding alkoxides, aryloxides and aralkoxides as exemplified, among others named, by benzyltrimethyl ammonium methoxide and ethoxide, and tetramethylammonium phenoxide. The patent proposes the use of these quaternary ammonium bases in polyurethane formulations in conjunction with compounds effective in neutralizing the quaternary base, as to produce low odor polyurethane foams.

Erner, in U.S. Pat. No. 3,010,963, discloses the preparation of quaternary hydroxyalkyl bases of diazabicyclo-octane and of imidazole by reacting the corresponding diazine or diazole with alkylene oxide and water. The obtained quaternary hydroxide can be further reacted with mineral or organic acid to produce salts. Thus, the patent describes the production of N,N'-bis hydroxy propyl diazabicyclo-octane dihydroxide and conversion of the same to salts by reaction respectively with sulfuric, cresylic, salicylic and phosphoric acids. The sulfates and phosphates are stated to have powerful inhibitory action on the growth of certain microorganisms such as yeasts, molds and sactobacilli. The patent does not describe any specific use for the organic acid salts. In another example of the patent, the quaternary hydroxide obtained by reaction of 2-methyl imidazole with propylene oxide and water, is converted to the acetate salt, which was tested as a polymerization promoter in polyurethane foam reactions when used in association with the theretofore known diazabicyclo-octane catalyst.

Lambert et al, U.S. Pat. No. 3,108,975, is concerned with the production of water blown polyurethane foams from polyether polyols having predominantly secondary hydroxyl end groups. The patent proposes for use as catalysts in this reaction, optionally in the presence of known tertiary amine catalysts, certain basic compounds such as hydroxides of alkali or alkaline earth metals, or of fully substituted quaternary ammonium radicals; or salts of the foregoing. Among the quaternary ammonium radicals listed are those of N-methylpyridinium, benzyltrimethyl ammonium and trimethyl cyclohexyl ammonium. Among possible salts, the patent lists generally alkoxides, phenoxides, carboxylates, carbonates and others. The patent contains no specific example using quaternary ammonium phenoxide or alkoxide in the production of polyurethane or in other polyisocyanate reactions.

In a companion application of Bechara, Ser. No. 377,446, filed July 9, 1973, now abandoned there are disclosed methods for synthesis of certain acyclic quaternary hydroxyalkyl ammonium alkoxides and phenoxides useful, among other suggested purposes, as catalysts for making polyurethane and polyurethane-polyisocyanurate foams. The therein disclosed compounds correspond to the general formula:

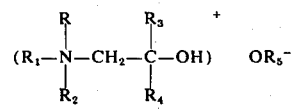

(I)    $(R_1-N(R,R_2)-CH_2-C(R_3,R_4)-OH) \ OR_5^-$ wherein:
R$_5$ is selected from the group consisting of H, alkyl of 1 to 2 carbon atoms and aryl or aralkyl group of 6 to 10 carbon atoms, and in which
R, R$_1$ and R$_2$ may be independently alkyl, hydroxyalkyl, aryl, aralkyl or cycloalkyl, and R$_3$ and R$_4$ are independently H, alkyl, aryl or aralkyl.

The use of the foregoing compounds of formula (I) as catalysts, is claimed in the continuation-in-part of the present application, Ser. No. 377,447 now U.S. Pat. No. 3,892,687.

SUMMARY OF THE INVENTION

It has now been found, in accordance with the present invention, that phenoxides of certain cyclic quaternary ammonium bases are useful catalysts in reactions involving organic isocyanates, such as in the formation of polyisocyanurates, polyurethanes and polyurethane-polyisocyanurate resins. The quaternary phenoxides employed contain a hydroxylated alkyl group attached to a hetero N of the base and correspond to the general formula (II) 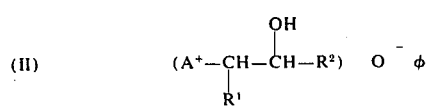

wherein:
A is a mono- or bicyclic tertiary amine having at least 4 carbon atoms in an azine ring,
R¹ is H or an alkyl group of 1 to 10 carbon atoms,
R² is H or an alkyl or aryl group of 1 to 10 carbon atoms, and
φ is a phenyl group which may be further substituted by one or more hydroxyl or alkyl groups.

The preferred catalyst compositions employed in practice of the invention are those obtained by reacting triethylene diamine (1,4 diazabicyclo octane) or 2-methyl-1,4 diazabicyclo octane, with propylene oxide and phenol comprising respectively compounds of the formulae:

(III) 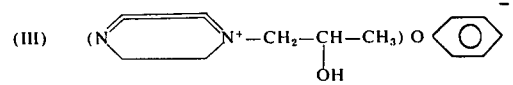

and (IV) 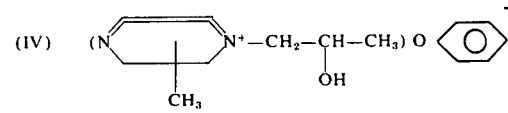

In reacting the tertiary N-heteroxyclic compound with a phenol and an alkylene oxide, not all of the tertiary nitrogen is quaternized and the reaction product will contain unreacted tertiary amine. It is unnecessary to isolate the quaternized compound from the reaction mixture since the entire reaction mixture may be and preferably is used as catalyst in the practice of the present invention.

DETAILED DESCRIPTION OF THE INVENTION

1. Preparation of the Catalysts

The catalysts used in accordance with the invention are prepared by reacting a heterocyclic nitrogen compound with an alkylene oxide and a phenol. The starting heterocyclic nitrogen compound is one selected from among mono and diazines; that is, heterocyclic compounds containing one or two tertiary nitrogens in a six membered ring, as exemplified by:

 1,4-diazabicyclooctane

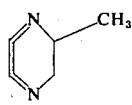 2-methyl-1,4 diazabicyclooctane

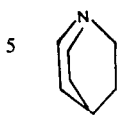 1-azabicyclooctane (Quinuclidine)

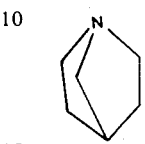 1-azabicyclonorbornane

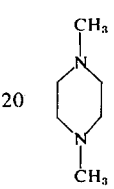 1,4-dimethylpiperazine

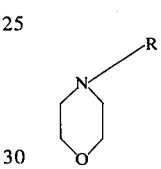 N-alkyl morpholine

 1,4-diazabicycloheptane (2.2.1)

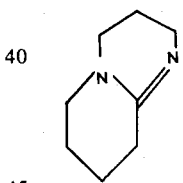 diazabicyclo-undecene

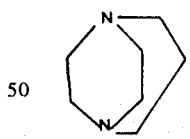 1,5-diazabicyclononane (2.2.3)

Among the particular oxides that can be utilized for reaction with the foregoing hetero compounds are the short chain alkylene oxides of 2 to 4 carbon atoms. Other oxides that can be employed in similar reactions to produce related compounds include longer chain alkylene oxides, cyclic oxides, and olefinically unsaturated oxides. Typical compounds falling with the foregoing designations include: ethylene oxide, propylene oxide, 1,2-butylene oxide, 2,3-butylene oxide, styrene oxide, cyclohexane oxide, and oxides of longer chain olefins, including dienes and trienes.

The reactant phenol may be unsubstituted or substituted by one or more other substituents that remains non-reactive in the principal reaction, such as short or long chain alkyl or alkoxy groups or hydroxy groups.

Included among such phenols are: phenol, methyl phenol, methoxy phenol, bisphenol,(p,p'-dihydroxydiphenylmethylmethane), nonyl phenol, resorcinol, hydroquinone, and the like.

The reaction may be carried out in the absence of solvent or in the presence of an inert substantially anhydrous organic solvent such as dipropylene glycol, carbocyclic hydrocarbons such as benzene or toluene, dimethyl formamide, dioxane, and the like. Reaction will take place at ambient room temperature and the reaction temperature should not be permitted to rise to the point of volatilization or decomposition of any of the reactants or of the reaction product. The preferred temperature range is about 30° – 50°C. The tertiary amine may be employed in excess of stoichiometric molar proportions and the resulting reaction product will contain unreacted tertiary amine as well as the quaternized compound. When a diazine is employed, the reaction product may contain in addition to the mono-quaternary compound and unreacted tertiary amine, some corresponding diquaternary compound.

The presence of free water in the reaction is to be avoided so as to preclude the accompanying formation of the less stable quaternary ammonium hydroxide. The principal reaction proceeds by way of illustration in accordance with the following schematic equation:

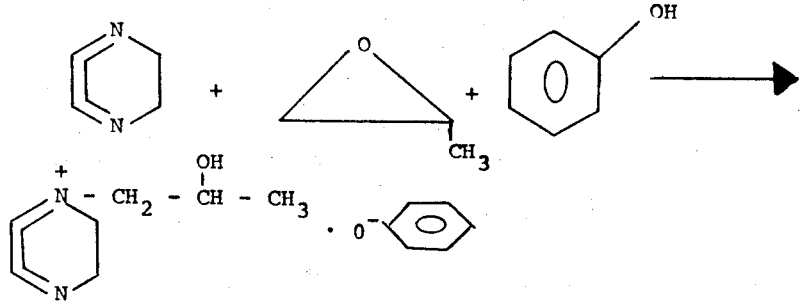

2. Catalyzed Reactions

The products obtained in accordance with the reactions hereinabove described, comprising the quaternary azinium hydroxyalkyl phenoxide, are strong bases having high activity in promoting organic isocyanate polymerization reactions as well as reactions of organic isocyanates with polyols containing active hydrogen for production of polyurethanes or polyurethane-polyisocyanurate resins. The quaternary compounds of the invention may be employed alone or with co-catalysts or activators of the tertiary amine or metal salts having known activity in isocyanate reactions. The present quaternary phenoxides offer distinct and unexpected advantages over earlier proposed quaternary ammonium hydroxides and alkoxides because of their higher stability to heat and storage, and their higher catalytic activity.

The following Example illustrates the general procedure employed in preparing the catalysts of the invention. It will be understood that the same general method is applicable in preparing the other corresponding quaternary phenoxide compounds employing the particular reactant components listed above.

EXAMPLE 1

Into a reaction vessel equipped with a stirrer, thermometer and a reflux condensor, there was charged 200 parts by weight of a 33% solution (by weight) of diazabicyclo-octane in dipropylene glycol and 24 parts of phenol. When all of the phenol was dissolved and the temperature of the reaction mixture steadied at about 35°C, 15 parts of propylene oxide was added slowly while stirring, with the temperature of the reaction mixture maintained at about 40° – 45°C. After all of the propylene oxide had been added, stirring of the reactants was continued for an additional two hours.

The reaction product contained mono- and di quaternary ammonium phenoxide as well as unreacted tertiary amine and dipropylene glycol solvent. The product was analyzed by a titrimetric method, the results of which analysis are reported in Table I below.

EXAMPLE 2

The procedure in Example 1 above was repeated substituting for the diazabicyclooctane solution an equivalent amount of 2-methyl diazabicyclooctane dissolved in dipropylene glycol. The results of titrimetric analysis are reported in Table I below:

TABLE I

| Example | Tertiary Amine | Carbinol | Alkylene Oxide | Titrimetric Analysis Quat. Meq./g | t-amine Meq./g |
|---|---|---|---|---|---|
| 1 | TEDA | Phenol | Propylene Oxide | 1.09 | 1.42 |
| 2 | Me-TEDA | Phenol | Propylene Oxide | 1.22 | 1.34 |

TEDA = Triethylene diamine (diazabicyclo-octane)
Me-TEDA = 2-Methyl triethylene diamine
Quat. Meq./g = Milliequivalents of the quaternary per gram of sample.
t-amine Meq./g = Milliequivalents of the t-amine per gram of sample.

The activity of the catalysts produced in the foregoing Examples is illustrated in the following runs.

EXAMPLE 3 a. In a reaction vessel there was admixed (by weight) 15 parts toluene, 5 parts of phenyl isocyanate and one part of the catalyst mixture of Example 1. After thoroughly admixing the reactants, the mixture was allowed to stand at room temperature for two days. The solid precipitate that was formed during this period was filtered off and washed with a small portion of toluene, then dried in a vacuum oven at 60°C for 1 hour.

b. The same procedure was followed in a similar run using the catalyst composition of Example 2.

The yield of triphenyl isocyanurate in each of the foregoing runs is reported in Table II below as compared with that obtained by a control run with a commercial high activity tertiary amine catalyst used in equal proportion.

TABLE II

| Amine Catalyst | Triphenyl-Isocyanurate Product | |
|---|---|---|
| | M.P. °C | % Yield |
| Diazabicyclo-octane in DPG (33% solution) | 150 – 153 | 0 |
| Example 1 | 284 – 285 | 96 |
| Example 2 | 284 – 286 | 94 |

The foregoing melting points recorded in Table II can be compared with the melting range of 282° – 284.9°C for the triphenyl isocyanurate product reported by B. D. Beitchman in *Industrial and Engineering Chemistry Product Research and Development*, Vol. V, at pages 35 – 41 (1966). Thus, it is seen that the quaternized compound is highly active in the production of isocyanurate trimer; whereas, the corresponding tertiary amine shows practically no activity.

The following Example illustrates the use of the cyclic quaternary N-hydroxyalkyl phenoxides of the invention in the production of rigid polyurethane foams.

EXAMPLE 4

Each sample of foam was prepared using a precursor containing:

| | Grams |
|---|---|
| Selectrofoam 6406 (1) | 109 |
| D. C. - 193 (2) | 1.5 |
| Trichlorofluoromethane | 47 |
| Hylene TIC (3) | 105 |

1. Selectrofoam 6406 is a mixture of polypropylene oxide propanol derivative of sucrose and an alkylene oxide derivative of ethylene diamine having a molecular weight of about 800 (see U.S. Pat. No. 3,153,002) and is manufactured by Pittsburgh Plate Glass Co.
2. D.C.-193 is a surfactant comprising polysiloxane polyoxyalkylene block copolymers, such as those described in U.S. Pat. Nos. 2,834,748 and 3,917,480; manufactured by Dow-Corning Company.
3. Hylene TIC is a technical grade of tolylene diisocyanate (TDI), has an amine equivalent of 105.5 – 108 and a NCO content of about 39 and is manufactured by E. I. duPont de Nemours and Co.

The precursor and the selected catalysts were subjected to a standard hand mix procedure for the "one-shot" preparation of a rigid foam. Measurements were taken during the runs of the cream time, gel time and rise time. The data obtained is given in Table III below together with the amount of catalyst composition employed.

TABLE III

| Catalyst | PHP(a) | Cream Time (Secs.) | Gel Time (Secs.) | Rise Time (Secs.) |
|---|---|---|---|---|
| Example 1 | 0.33 | 12 | 62 | 115 |
| Example 2 | 0.33 | 13 | 68 | 125 |

(a)Total weight including DPG solvent.

The catalysts of the invention, being prepared in the absence of water, are particularly suited for use in production of rigid polyurethane foams employing separate blowing agents under control, without interference by the otherwise possible release of $CO_2$ by the reaction of isocyanate and water.

The catalysts of the invention also find use in the preparation of flexible polyurethane foams as illustrated in the following Example.

EXAMPLE 5

Each sample of the flexible foam was prepared using a precursor containing

| | Grams |
|---|---|
| Voranol CP-3000 (4) | 100 |
| Silicone L-520(5) | 1.2 |
| Water | 3.6 |
| T-9 Catalyst(6) | 0.25 |
| Hylene TM 80/20 (7) | 45.5 |

4. Voranol CP-3000 is a glycerine based polyoxypropylene polyol having a hydroxyl number of 534 – 590 and is manufactured by Dow Chemical Company.
5. Silicone L-520 is a polyalkylene oxide polysiloxane surfactant of Union Carbide and Chemicals Co.
6. T-9 Catalyst is stannous octoate manufactured by M & T Company.
7. Hylene TM 80/20 is a mixture of tolylene 2:4 and tolylene 2:6 diisocyanates manufactured by duPont de Nemours and Company.

The precursors and selected catalysts were subjected to standard hand mix procedures for the "one-shot" preparation of flexible foam. Measurements were taken during the runs of the cream time, rise time and hard gel time. The data are reported in Table IV below together with the amount of catalyst composition employed in each of the runs.

TABLE IV

| Catalyst | PHP(a) | Cream Time (secs.) | Rise Time (secs.) | Hard gel Time (secs.) |
|---|---|---|---|---|
| Example 1 | 0.2 | 15 | 80 | 93 |
| Example 2 | 0.2 | 16 | 85 | 95 |

(a)Total weight including DPG solvent.

While certain tertiary amines are effective catalysts for polyurethane reactions, these in general show little or no activity in production of isocyanurate resins. On the other hand, the quaternized compounds of the invention show good activity in production of polyisocyanurate resins as well as polyisocyanurate - polyurethane resins.

These polyisocyanurate resins have superior thermal and hydrolytic stability compared to conventional polyurethane resins.

The following example illustrates the catalytic superiority of the phenoxide catalysts of the invention as compared to the corresponding hydroxides, in the preparation of polyisocyanurate - polyurethane resins.

EXAMPLE 6

A premix was prepared from

| | PBW |
|---|---|
| Pluracol FS-529 (8) | 100 |
| Freon 11B (9) | 44 |
| D.C.-193 | 1.5 |
| Catalyst (10) | (as indicated) |

TABLE VI

| Days | Ex. 1 Phenoxide | | Diazabicyclo-octane hydroxide (note 10) | | Ex. 2 Phenoxide | | Methyldiazabicyclo-octane hydroxide (note 10) | |
|---|---|---|---|---|---|---|---|---|
| | Meq/g quat. | Meq/g tert. | Meq/g quat. | Meq/g tert. | Meq/g quat. | Meq/g tert. | Meq/g quat. | Meq/g tert. |
| 1 | 1.49 | 0.54 | 1.50 | 0.81 | 1.52 | 0.41 | 1.58 | 0.08 |
| 2 | 1.48 | 0.55 | 1.37 | 0.93 | 1.53 | 0.41 | 1.57 | 0.80 |
| 4.7 | 1.47 | 0.56 | 1.32 | 0.98 | 1.56 | 0.41 | 1.57 | 0.83 |
| 8.5 | 1.47 | 0.57 | 1.25 | 1.06 | 1.51 | 0.42 | 1.51 | 0.88 |
| 13.5 | 1.44 | 0.56 | 1.18 | 1.09 | 1.54 | 0.41 | 1.46 | 0.92 |
| 21.3 | 1.43 | 0.57 | 1.11 | 1.16 | 1.50 | 0.41 | 1.35 | 1.00 |

To this premix there was added 145 parts of PAPI (index 200). The results obtained in the several runs are reported in Table V below:

TABLE V

| | Catalyst | PHP | Cream Time (secs.) | Gel Time (secs.) | Tack Free Time (secs.) | Rise Time (secs.) |
|---|---|---|---|---|---|---|
| Ex. 1 | phenoxide | 4.2 | 12 | 51 | 120 | 178 |
| " | hydroxide | 3.7 | 18 | 72 | 128 | 179 |
| Ex. 2 | phenoxide | 4.4 | 15 | 42 | 92 | 135 |
| " | hydroxide | 3.82 | 16 | 64 | 157 | 208 |

8. Pluracol FS-529 is a halogen containing polyol comprising the condensation product of phosphoric acid, tetrachloro and tetrabromo phthalic anhydride with propylene oxide, has an equivalent weight of 192 and is supplied by Wyandotte Chemical Company now BASF-Wyandotte.

9. Freon 11B is trichloro-monofluoro-methane.

10. The corresponding hydroxide catalysts were prepared by reacting diazabicyclo-octane and C-methyl diazabicyclo-octane respectively in aqueous solution with propylene oxide as described in U.S. Pat. No. 3,010,963 (Example II). The quantities of the hydroxide catalyst employed are equivalent in molar parts to those of the corresponding phenoxide with which these are compared. In each case, the catalysts had been stored for 21 days prior to use.

The exceptional stability of the phenoxides of the present invention as compared to the corresponding hydroxides, is further shown in the following tests. Each of the following catalyst compositions was prepared as hereinbefore indicated and then stored in an oven at 40°C. These were each titrated periodically and the relative contents of quaternary amine and tertiary amine determined. The results are reported in Table VI, below:

These tests clearly demonstrate the relatively rapid loss of quaternary amine function of the hydroxides as compared to the high stability of the corresponding quaternary phenoxides.

In another series of similar tests it was established that the quaternary phenoxides were exceedingly more stable than the corresponding quaternary alkoxides (benzyloxides).

The remarkable stability of the anhydrous reaction products such as those produced in Examples 1 and 2 and comprising the quaternary N-hydroxy alkyl phenoxides as compared to the corresponding hydroxides and alkoxides, is particularly evident on longer periods of storage as demonstrated by the aging tests reported in Table VII below:

TABLE VII

| Compound | Initial Analysis | | Analysis after ~75 days at 40°C | |
|---|---|---|---|---|
| | meq/g quat. | meq/g tert. | meq/g quat. | meq/g tert. |
| Ex. 1 product | 1.49 | 0.57 | 1.41 | 0.57 |
| Diazabicyclo-octane hydroxide | 1.50 | 0.82 | 0.81 | 1.44 |
| Ex. 2 product | 1.52 | 0.44 | 1.47 | 0.43 |
| Me-diazabicyclo-octane hydroxide | 1.58 | 0.80 | 1.07 | 1.27 |
| Diazabicyclo-octane alkoxide | 1.41 | 0.70 | 0.98 | 1.08 |
| Me-diazabicyclo-octane alkoxide | 1.34 | 0.66 | 0.75 | 1.17 |

EXAMPLES 7 – 10

The same procedure was followed in these Examples that was followed in Example 1, except that no solvent was employed and equivalent amounts of different amines and carbinols were used. The titrametric analyses of the products are listed in Table VIII below:

TABLE VIII

| Example | Tertiary Amine | Carbinol | Alkylene Oxide | Titrametric Analysis | |
|---|---|---|---|---|---|
| | | | | Meq/g Quat. | Meq/g Tert. |
| 7 | Pyridine | Phenol | Propylene Oxide | 1.42 | 2.41 |
| 8 | N-Ethyl Morpholine | Phenol | Propylene Oxide | 1.19 | 2.48 |
| 9 | N,N-Dimethyl-piperazine | Phenol | Propylene Oxide | 1.98 | 1.79 |
| 10 | Dimethyl-benzylamine | p-methoxy phenol | Propylene Oxide | 2.41 | 4.53 |

EXAMPLES 11 – 13

These Examples illustrate further the catalytic superiority of the phenoxides in the preparation of polyisocyanurate resins.

A premix was prepared from:

|  | Parts by Weight (PBW) |
| --- | --- |
| Voranol RS-350 (11) | 20 |
| D.C.-193 | 1.5 |
| Freon 11B | 20 |
| Catalyst | (As indicated in Table IX below) |
| Mondur MR (12) | 100 |

11. Voranol RS-350 is a polyol formed by the reaction of sucrose, glycerine and propylene oxide, has equivalent weight of 160 and hydroxyl number of 350 and is supplied by the Dow Chemical Company.

12. Mondur MR is a mixture of 50% diphenyl methane diisocyanate and 50% of higher polymers of similar structure, has a 32% NCO content and an equivalent weight of 132, and is supplied by Mobay Chemical Company.

The resulting mixture was subjected to standard hand mix procedure for the "one-shot" preparation of foams. Measurements were taken during the runs of the cream time, gel time, rise time, and tack free times. The results obtained in these runs are reported in Table IX below:

TABLE IX

| Catalyst | % By Wt. of Isocyanate Used | Cream Time (Sec.) | Gel Time (Sec.) | Rise Time (Sec.) | Tack-Free Time (Sec.) |
| --- | --- | --- | --- | --- | --- |
| N-2-hydroxypropyl pyridinium phenoxide of Example 7 | 2.0 | 28 | 47 | 95 | 125 |
| N-2-hydroxypropyl N-ethyl morpholinium phenoxide of Example 8 | 2.0 | 20 | 37 | 62 | 98 |
| N,N-Dimethyl-N-2-hydroxypropyl piperizinium phenoxide of Example 9 | 2.0 | 13 | 23 | 30 | 42 |

While in the polymerization runs in the foregoing Examples, there were employed as catalysts the phenoxide salts of N-hydroxyalkyl diazabicyclo-octane and of N-hydroxy-alkyl-methyl diazabicyclo-octane, these are merely illustrative. The related N-hydroxyalkyl phenoxides corresponding to formula II above obtained from the other mono and bicyclic azines listed above, can likewise be employed as catalysts or co-catalysts in organic isocyanate reactions, such as in the production of polyisocyanurates, polyurethanes and polyisocyanurate-polyurethane resins. These catalyst compositions can be prepared in the like manner to the described hydroxyalkyl phenoxides of diazabicyclo-octane, and would have the high storage stability demonstrated.

The catalysts of the invention may be used in conjunction with commercially employed polyurethane catalyst such as tin octoate and dibutyl tin dilaurate as well as with the typical known tertiary amine catalysts such as diazabicyclo-octane, N-alkyl morpholines and the like.

The catalyst of the invention can be employed in formulations for production of polyurethane and polyurethane-polyisocyanurate foams by substitution in whole or in part for the catalysts heretofore employed in these formulations. Thus, the catalyst can be added to a precursor composition comprising the usual polyol, polyisocyanate, blowing agent and foam stabilizer. Among examples of the polyols that can be employed there are included: polyethylene glycol, polypropylene glycol, hydroxy terminated linear esters such as tetramethylene glycol adipate, glycol succinate, and the like. Other polyols of higher functionality include polyethylene ether derivatives of glycol, erythritol, pentaerythritol, mannitol, sucrose, etc.. In general, there can be employed polyols having at least two active hydrogens displaying activity according to the Zervitinoff test; Kahlev; J. Am. Chem.. Sec., 49, 3181 (1927).

Typical isocyanates employed for reaction with the polyols are those containing at least two isocyanate groups per molecule, such as tolylene diisocyanate (TDI) and the technical grades of undistilled mixtures of isomeric tolylene diisocyanates that are commercially available for this use. Other conventionally employed polyisocyanates that can be employed include diphenyl methane diisocyanate and diphenyl methane tetraisocyanate, hexamethylene diisocyanate, and the like.

While the catalysts of the invention can be employed in water-blown polyurethane foams, the full advantages of their use are demonstrated in fluorohydrocarbon blown foams and other formulations in which water is absent. Included among the known useful blowing agents are the various products marketed as Freons, including dichlorofluoromethanes, dichlorofluoroethanes, dichlorotetrafluoroethane (Freon 114) trichlorotrifluoroethane (Freon 113) and the like volatilizable liquid fluorocarbons known to be useful as blowing agents for polyurethanes; as well as such blowing agents as methylene chloride, carbon tetrachloride, and a volatile alkyl hydrocarbons such as butanes, pentanes and the like.

The foam stabilizer or surfactant which is generally included in the precursor formulation may be any compound effective in favoring the retention of the gas generated during the polymerization reaction, whereby the desired relatively small cell size is attained. These stabilizers may be of the conventional silicone type normally used in polyurethane formulations, such as silicone block copolymers comprising polyalkylene glycol units (commercially available under trade designations L-520, L-521 and D.C.-193). Other cell stabilizers that can be employed include: polymerization products of N-vinyl pyrrolidone alone or its copolymers with dibutyl maleate or its terpolymer with dibutyl maleate and vinyl acetate, described in copending application Ser. No. 180,183 filed Sept. 13, 1971 issued July 17, 1973 as U.S. Pat. No. 3,746,663.

The initial products obtained in reacting the starting azine in excess with the alkylene oxide and phenol compound, as hereinabove described will contain as much as 30 or more mol percent and up to about 75% of unreacted tertiary amine in addition to the quaternized compound(s). Since the quaternary hydroxylalkyl phenoxide formed is of higher molecular weight than that of the tertiary amine, these percentages of the tertiary compound in the reaction product that may be used as the catalyst composition in practice of the invention, are significantly less on a total weight basis, and the dilutive effect on the activity of the catalyst composition does not detract from such use.

The concentration of the catalyst composition in polyurethane formulations and for polyisocyanurate-polyurethane resins, including the quaternary and tertiary components ignoring the content of unseparated solvent, if solvent is employed in the synthesis thereof, may be in the range of 0.2 to 2 parts by weight per hundred parts of polyol and preferably in the range of 0.5 to 1.5 parts per hundred of the polyol. For the production of triphenyl isocyanurate and other trimerized carbocyclic isocyanates, the quantity of catalyst employed should be generally in the range of 0.5 – 5% by weight of the isocyanate used.

What is claimed is:

1. A process for preparing a catalyst composition for use in polymerization reactions involving organic isocyanates comprising reacting at a temperature in the range from ambient room temperature to a temperature less than the volatilization point of said composition or of the lowest boiling reactant an azine compound selected from the group consisting of 1,4-diazabicyclooctane, 2-methyl-1, 4-diazabicyclooctane, 1,4-dimethylpiperazine, 1,4-diazabicycloheptane and 1,5-diazabicyclononane with an alkylene oxide selected from the group consisting of ethylene oxide, propylene oxide, 1,2-butylene oxide, 2,3-butylene oxide, styrene oxide, and cyclohexene oxide and a phenol selected from the group consisting of phenol, methyl phenol, methoxy phenol, p,p'-dihydroxy-diphenyl-methylmethane, nonyl phenol, resorcinol and hydroquinone in the absence of water.

2. A catalyst composition for use in polymerization reactions involving organic isocyanates which consists of a quaternary ammonium compound corresponding to the formula:

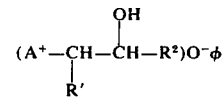

wherein A is 1,4-diazabicycloocatane, 2-methyl-1,4-diazabicyclooctane, 1,4-dimethylpiperazine, 1,4-diazabicycloheptane and 1,5-diazabicyclononane, $R^1$ is H or A methyl group, $R_2$ is H or a methyl, ethyl, cyclohexyl or phenyl group, and Q is phenyl, lower alkyl phenyl or hydroxy phenyl.

3. A catalyst composition as defined in claim 2 consists of the quarternary ammonium compound of the formula:

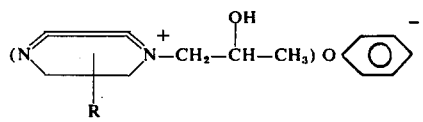

wherein:
R is H or methyl.

* * * * *